G. F. J. Colburn,

Hat and Coat Hook.

No. 1,997. Reissued June 13, 1865.

Witnesses:
Gustave Dulerich
J. P. Hall

Inventor:
G. F. J. Colburn,

N. PETERS, PHOTO-LITHOGRAPHER, WASHINGTON, D. C.

UNITED STATES PATENT OFFICE.

JAMES T. PRATT AND HORACE A. PRATT, OF NEW YORK, N. Y., ASSIGNEES OF GEORGE F. J. COLBURN.

IMPROVED COAT AND HAT HOOK.

Specification forming part of Letters Patent No. 44,853, dated November 1, 1864; Reissue No. 1,997, dated June 13, 1865.

*To all whom it may concern:*

Be it known that G. F. J. COLBURN did obtain Letters Patent for an Improved Coat and Hat Hook, which Letters Patent bear the date of November 1, 1864, and are numbered 44,853, which Letters Patent were assigned to JAMES T. PRATT and HORACE A. PRATT, both of the city, county, and State of New York; now we, the said J. T. PRATT and HORACE A. PRATT, do hereby declare that the following is a full, clear, and exact description of the same, reference being had to the accompanying drawings, forming part of this specification, in which—

Figure 2:
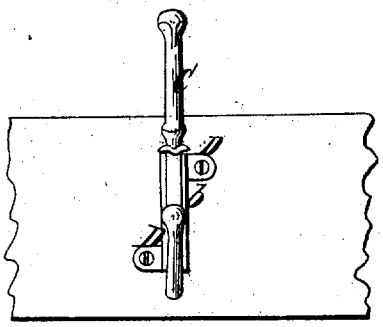
Figure 1:
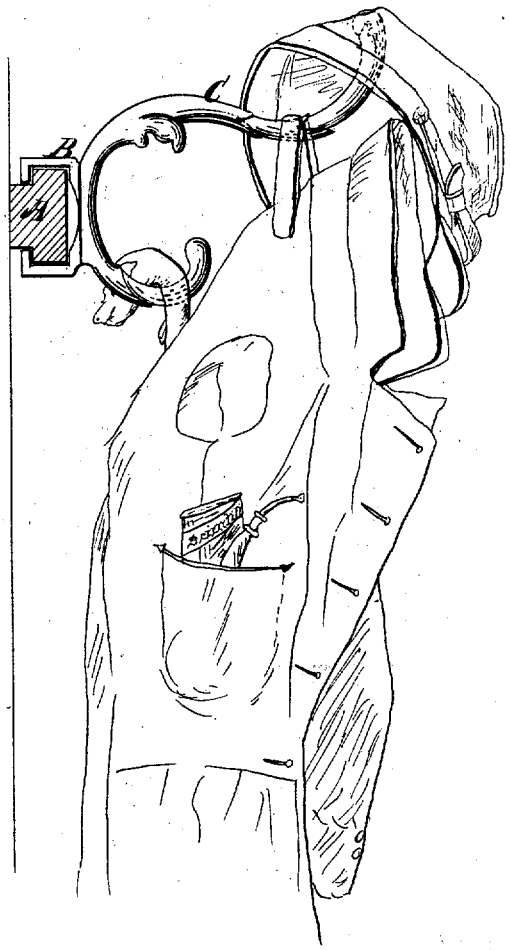
Figure 3:
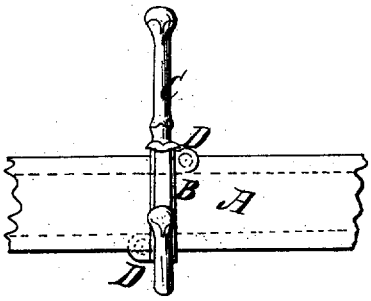

Figure 1 represents a sectional side elevation of this invention. Figs. 2 and 3 are front elevations of the same.

Similar letters of reference indicate corresponding parts.

The object of this invention is to arrange a coat and hat hook on a rail or bar of wood or other suitable material in such a manner that when the said bar is secured in the desired locality on a wall any desired number of hooks can be readily slid on it and be adjusted at the desired distance apart, and whenever it may be desirable said hooks can be removed instantaneously without the bar or removing a screw. Suitable side flanges projecting from the bracket of the coat and hat hook afford the opportunity to secure the hook by means of screws in the ordinary manner.

To enable others skilled in the art to make and use the invention, we will proceed to describe it.

A represents a bar, of wood or other suitable material, made in the form of a T, or provided with suitable grooves to receive the end or ends of a bracket, B, which is cast solid with or otherwise secured to the hook C. Said bracket may be U-shaped or double U-shaped or in any other desirable form or shape. The bar is represented in the drawings as being T-shaped; but it is obvious that the same effect would be produced if the bar would be made with a groove to receive the end or ends of the bracket.

The bracket shown in the drawings is double U-shaped, but in some cases a bracket of another form catching in a suitable groove or recess in the bar or rail A would answer the desired purpose, though it will be readily understood that by the use of a double U-shaped bracket a firm hold is given to the hook, which cannot be given to it by the use of a bracket of another shape.

The bar A is secured in the desired position on a wall, or wherever it may be convenient, and the hooks are slid on and adjusted at the desired distance apart. No screw or nails are required to fasten the hooks, and they can be readily adjusted at the desired distance apart according to the clothes or other articles to be hung up on the same, and whenever it may be desirable one or more of the hooks (or all) may be removed without disturbing the bar A.

In order to fasten the hook C to a plain bar of wood, or to a post, or to any other spot where a grooved or T-shaped bar cannot be conveniently put up, I have provided the flanges D, projecting from the opposite sides of the bracket B, as clearly shown in Figs. 2 and 3. These side flanges are perforated with holes to admit screws or nails, and they are so situated in relation to the bracket that the hook can be readily slid on the bar, as shown in Fig. 3.

In practice, the flanges, the bracket, and the hook can all be cast solid, and a hook can thus be produced which can be attached to any convenient place like an ordinary hook, and which can be readily slid on a grooved or T-shaped bar whenever such a bar may be put up.

If the hook is made with a single U-shaped bracket, it can be steadied by a projection or spike.

It will be perceived that a loop in the flange of the hook may be made to traverse upon a plain square bar and answer the same purpose in some respects as the T-shaped or grooved bar and the double or single U-shaped bracket of the hook.

We claim as new and desire to secure by Letters Patent—

The T-shaped bar A, on which slide double U-shaped brackets B, of hook C, substantially as and for the purposes specified.

JAS. T. PRATT.
HORACE A. PRATT.

Witnesses:
M. M. LIVINGSTON,
C. L. TOPLIFF.